(12) United States Patent
Kimotho et al.

(10) Patent No.: US 9,069,737 B1
(45) Date of Patent: Jun. 30, 2015

(54) MACHINE LEARNING BASED INSTANCE REMEDIATION

(71) Applicant: Amazon Technologies, Inc., Reno, NV (US)

(72) Inventors: Laban Mwangi Kimotho, Cape Town (ZA); Jean-Paul Bauer, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 164 days.

(21) Appl. No.: 13/942,625

(22) Filed: Jul. 15, 2013

(51) Int. Cl.
*G06F 11/00* (2006.01)
*G06F 11/22* (2006.01)
*G06F 11/14* (2006.01)

(52) U.S. Cl.
CPC ........ *G06F 11/2257* (2013.01); *G06F 11/1484* (2013.01)

(58) Field of Classification Search
CPC .................. G06F 11/2257; G06F 11/1484
USPC .................................. 714/26, 48, 49
See application file for complete search history.

(56) References Cited

U.S. PATENT DOCUMENTS

| | | | |
|---|---|---|---|
| 7,885,915 B2 * | 2/2011 | Parson et al. | 706/47 |
| 2008/0256533 A1 * | 10/2008 | Ben-Yehuda et al. | 718/1 |
| 2012/0053925 A1 * | 3/2012 | Geffin et al. | 703/21 |

* cited by examiner

*Primary Examiner* — Dieu-Minh Le
(74) *Attorney, Agent, or Firm* — Davis Wright Tremaine LLP

(57) ABSTRACT

Computer systems, such as network computing resources systems, are subject to hardware and software errors. To improve error handling and troubleshooting, information relating to errors is collected from a multitude of computer system and analyzed. As a result of this analysis, troubleshooting errors in computer systems is improved and errors are remediated automatically.

24 Claims, 10 Drawing Sheets

MACHINE LEARNING BASED INSTANCE REMEDIATION

BACKGROUND

The use of remote computing services, such as remote program execution and remote data storage has greatly increased in recent years. Customers may reduce expenses and overhead by purchasing these services from a service provider. Services such as remote program execution and remote data storage, however, are still subject to the same or similar errors as more traditional computing equipment. Possible errors include, but are not limited to, memory errors, kernel errors, file system errors, and operating system errors. In both a more traditional computing environment and a remote computing environment, when errors occur a troubleshooting process may be used to determine the cause of the error and provide a solution. At any given time in a remote computing environment multiple users may be experiencing errors and engaging in troubleshooting. Many of these users may be experiencing the same error and may correct the error using different methods with varying degrees of success. Some of the methods used may even be successful in correcting different errors and much can be learned from the experience of multiple users in solving the errors that occur.

BRIEF DESCRIPTION OF THE DRAWINGS

Various embodiments in accordance with the present disclosure will be described with reference to the drawings, in which.

DETAILED DESCRIPTION

Figure 1:
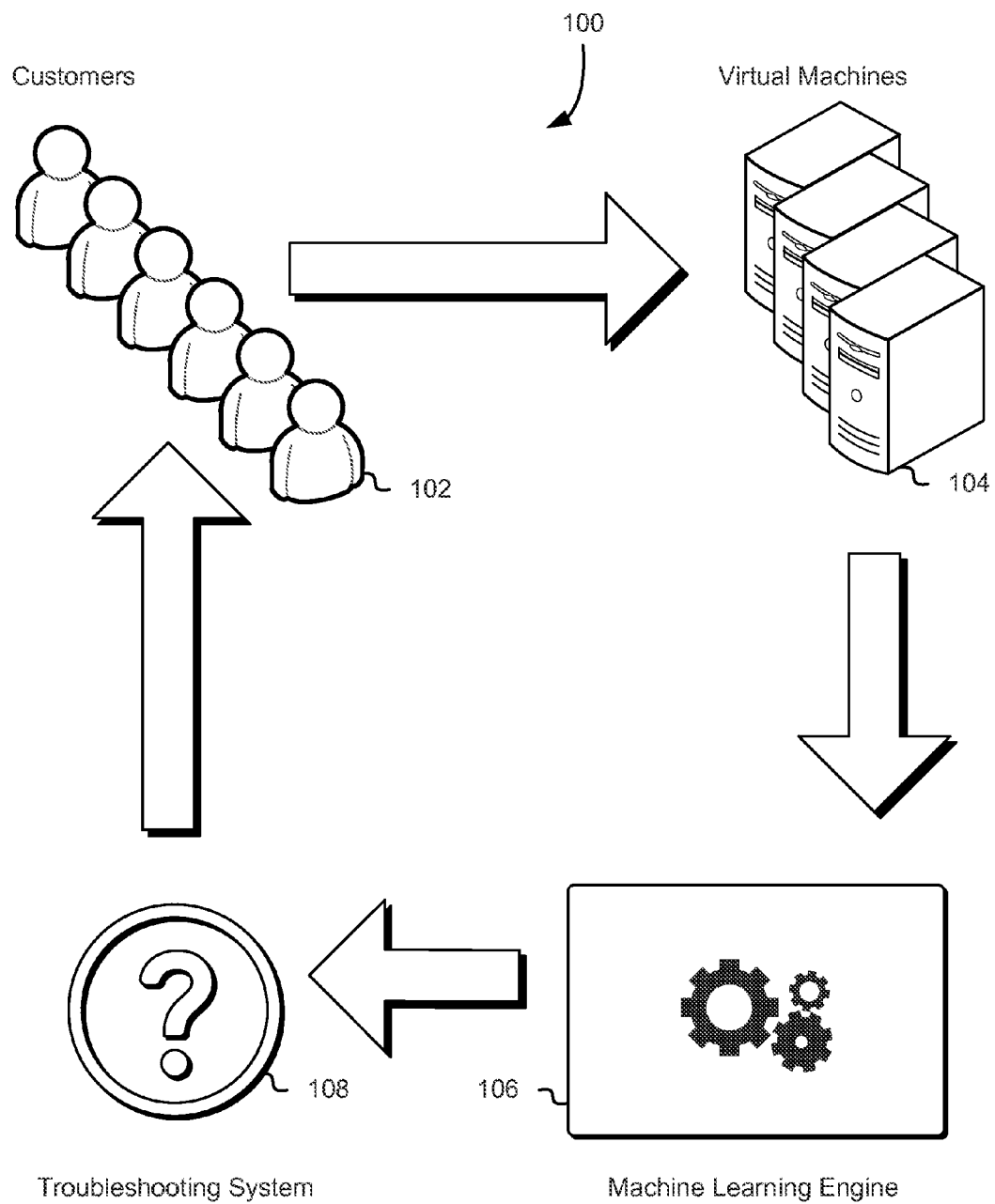
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for troubleshooting errors in computer systems using large data sets and machine learning to refine and improve results. In various embodiments customers execute virtual machine instances (also referred to a computer system instances or simply as instances) on computing resources operated by the computing resource service provider (also referred to as a service provider). On occasion these instances encounter errors and customers apply various troubleshooting techniques to correct these errors. The errors encountered by customers and the steps taken in correcting errors are, in various embodiments, recorded and tracked. Machine learning algorithms can be applied to this information and analysis of the information by machine learning algorithms may yield a set of solutions to encountered errors. The computing resource service provider using this technique may, in various embodiments, monitor the operation of instances and automatically recognize and correct errors that occur. The customer may to opt in to allow the service provider to collect and analyze console data as well as provide troubleshooting solutions or apply troubleshooting solutions automatically to customer instances.

In various embodiments, when a customer launches an instance of the computer resources operated by a service provider, the instance generates console data which may be logged by the service provider. The console data may represent the operational status of the instance and the customer's interaction with the instance. In various embodiments, console data may include metadata regarding the instance, such as the type of virtual machine, the operation of instance, the launch parameters given to the instance, hypervisor state, type of hypervisor, customer identification information or other information regarind the instance or instance operation. In a virtualized environment the console data generated by the computing system instance may be a result of communication between a hypervisor or virtual machine manager and the underlying hardware. In various embodiments, console data maybe data generated from user actions taken directly through the user interface of the computing system instance or action taken by the user through a user interface provided by the service provider for managing instances. For example, console data may include requests sent to the service provider through a web browser and API calls, such as launching a computing system instance. Console data may be collected directly from an instance or retrieved from metadata.

Console data from an computer system instance may then be passed to a machine learning engine, which may use one or more machine learning algorithms to match the console data to a set of rules corresponding to a class. The console data may represent an error state and, once that error state has been classified, the machine learning algorithm's rules for that class may be updated with information from the console data. That information may include, for example, an error code outputted by the instance to the console or commands entered into the console by the customer. Furthermore, in various embodiments, once the console data has been classified, a particular error maybe discovered and a solution to that particular error may be suggested to the customer through a troubleshooting system operated by the service provider. The customer may then be asked if the suggested solution corrected the error and the troubleshooting system may then be updated accordingly.

In various embodiments, the machine learning engine may be seeded with a set of manually created classes and rules for each class, then the machine learning engine may be allowed to analyze data, enabling it to learn from and modify the seeded information over time. During the learning process the machine learning engine may receive console data and determine from the console data if it matches a currently know class. If no match is found, the machine learning engine may create a new class. However, if a match is found the information from the console data may be added to the class. For example, in some embodiments, the machine learning engine may receive console data which contains a memory error and steps taken by the user to correct the memory error. The machine learning engine may then use a machine learning algorithm, such as a Bayesian network, to match the console data to a known class. Once the console data is classified as a memory error it may be examined to determine the steps the customer took to correct the error and if the steps taken were successful. The machine learning engine may then update troubleshooting information corresponding to the error and/or classification of the console data.

In various embodiments, the machine learning engine may be allowed to learn unsupervised without the use of seeded information. The machine learning engine may receive console data and cluster like information to create classes and rules. The machine learning engine may also learn solutions for a particular class based on information found in the console data. In various embodiments, the machine learning engine may be extended to provide solutions for customers when the customer encounters an error or used in conjunction with a troubleshooting system. In some embodiments, the machine learning engine alone or in conjunction with the troubleshooting system may proactively scan console data to correct errors. This type of error correction may take place before the error occurs, contemporaneously as the error occurs, or at some time after the error has occurred. The machine learning engine is not limited to any particular machine learning algorithm and may use various algorithm types, such as: supervised learning algorithms, unsupervised learning algorithms, semi-supervised learning algorithms, reinforcement leaning algorithms, learning to learn algorithms, or suitable learning algorithm.

FIG. 1 shows a diagram illustrating various aspects of the present disclosure. As noted above, the techniques described herein are applicable to troubleshooting computer errors, particularly in environments where the experiences of many computer users may be used as a learning tool to improve troubleshooting. Accordingly, FIG. 1 shows customers 102 operating virtual machines 104; these virtual machines or instances may be executed locally on the customer's computer or remotely on computer hardware operated by a service provider. The customers may on occasion encounter errors in instances during operation and attempt to correct these errors. Information regarding operation of the instance, errors that may occur, and actions taken by the customer are recorded in the console. In various embodiments, the console may be a command line interface, such as the console in LINUX® based operating systems or the console may contain a graphical display, such as a graphical user interface (GUI) and console data from a GUI may be any information displayed or generated by the GUI. The console data may include information generated by the operating system executing on the instance, which may include information not displayed to the customer operating the instance, including information written to a log file. For example, during boot operations the operating system may check attached disk for errors, this information may be included in the console data but hidden from the customer. In various embodiments, console data from a GUI may be retrieved using optical character recognition (OCR) or other suitable methods from retrieving data from images, the console data may be transmitted to the machine learning engine 106 for processing. In various embodiments, this processing may include parsing the console data to find errors that occurred during the operation of the instance and steps taken by the customer operating the instance.

In various embodiments, the console data may be analyzed using one or more machine learning algorithm, such as: naïve Bayes classifier, decision trees, learning automata, Gaussian process regression, nearest neighbor, random forest, ordinal classification, support vector machine, k-means clustering, lazy learning, artificial neural network or, generally, any suitable machine learning algorithm or combination of algorithms. Once analyzed, the machine learning engine 106 may classify the console data, update classification rules, and determine what solution, if any, the customer may have applied. The solution information may, in various embodiments, be transmitted to the troubleshooting system 108 for use in correcting errors that may occur in customer instances in the future. As an example, in the troubleshooting system 108, successful solutions discovered by the machine learning engine maybe stored and given a rank based on the number of times the solution has been applied to solve a particular class of errors or any other suitable metric. This information may be store in a format easily accessible to users, such as a webpage and automatically updated with information from the machine learning engine.

In various embodiments, the machine learning engine 106 may operate in two distinct phases; a training phase and a monitoring phase. During the training phase, the machine learning engine 106 may be seeded with a predetermined set of classifications and rules for each classification. For example, know error types may be used as classifications and known error codes may be used as rules. This information may be written in a format suitable for use by the machine learning engine (i.e., a format that the machine learning engine is programmed or otherwise configured to use) and loaded into the machine learning engine for training. Once the machine learning engine is seeded with information, the machine learning engine may then be passed console data for classification, the results may be checked for any misclassifications, and the rules may be updated accordingly.

Updating the rules may occur manually or automatically by the machine learning engine once the machine learning engine has been appraised of the misclassification. The machine learning engine may be passed console data from any number of instances, such that the data set is suitable for supervised training purposes. In various embodiments, it is possible for the machine learning engine 106 to conduct the training phase entirely unsupervised. As an example, the machine learning engine may be passed console data and one or more unsupervised machine learning algorithms may be used to determine classifications based on similar features or characteristics of the data sets. The machine learning engine may use multiple unsupervised machine learning algorithms and determine classifications and rules for each classification based on consensus or any other suitable selection methods. The machine learning engine may be passed console data from any number of instances, such that the data set is suitable for unsupervised training purposes.

In various embodiments, during the monitoring phase the machine learning engine alone or in conjunction with the troubleshooting engine may monitor the operation of customer instances as they are executed. As an example of the monitoring phase, in some embodiments console data may be contemporaneously generated and stored in service provider storage. Once console data written to storage reaches a predetermined threshold it may be passed to the machine learning engine 106 to be analyzed. The threshold may be set such that the amount of data is large enough for the machine learning engine to be able to classify. The threshold may also be a predetermined amount of time, or any other suitable thresholds for monitoring may be used. In various embodiments the console data maybe parsed for relevant information before being passed into the machine learning engine 106. In other embodiments, the machine learning engine 106 may itself parse the console data in order to determine relevant information. Relevant information may include events, such as error messages displayed in the console and features of events, such as operation performed by the customer utilizing the instance.

In various embodiments, once the machine learning engine 106 has received the console data it may then, using one or more machine learning algorithms, classify the console data received. If the console data matches a known classification, information may be passed to the troubleshooting system for remediating the instance from which the console data was received. For example, in various embodiments, if the machine learning engine classifies console data as a kernel error state, the machine learning engine may pass information for identifying the error and the instance from which the error occurred to the troubleshooting system 108. The troubleshooting system 108, in some embodiments, may apply a known solution automatically or transmit solution information to the customer and inquire about the solution's efficacy.

Information about the solution's effectiveness may be used to update the troubleshooting system. In various embodiments, if the troubleshooting system receives information from the machine learning engine regarding an error for which no solution exists, the troubleshooting system 108 may monitor the customer's behavior in order to determine what steps, if any, the customer may take in order to correct the error. The troubleshooting engine 108 may also have a default solution for unknown errors, such as rebooting the instance or rolling the instance back to a point in time before the error occurred. In various embodiments, the troubleshooting system maybe a website automatically updated with information from the machine learning engine. In various embodiments, all or some of the activities of the troubleshooting system may be executed by the machine learning engine.

Figure 2:
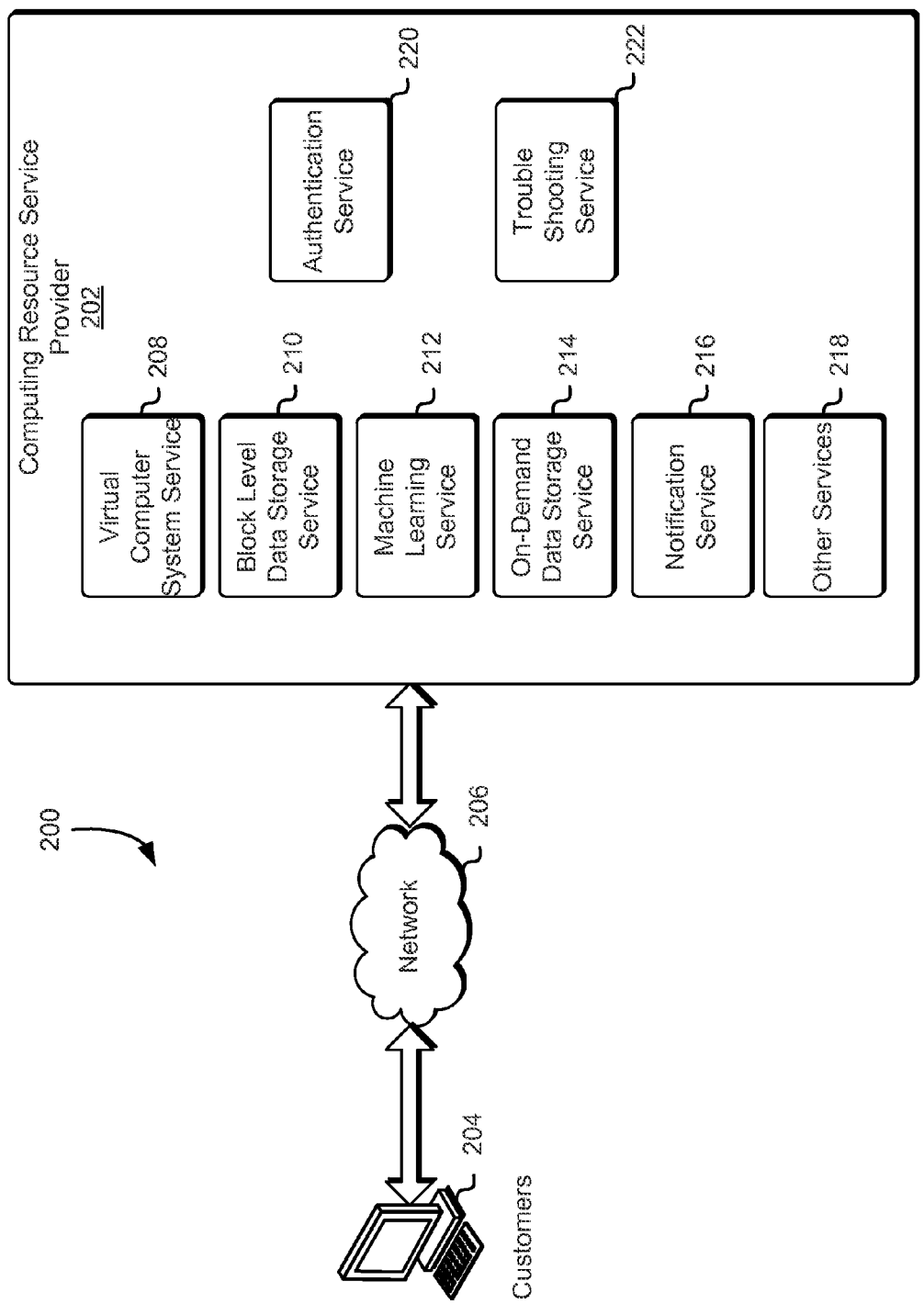
FIG. 2 shows an example of a customer connected to a computing resource service provider.

FIG. 2 shows an example of a customer connected to a computing resource service provider. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such as the Internet, an intranet, or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202 in this example include a virtual computer system service 208, a block-level data storage service 210, a machine learning service 212, an on-demand data storage service 214, a notification service 216, an authentication service 220, a troubleshooting service 222, and one or more other services 218. It is noted that not all embodiments described herein include the services 208-222 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications, or, generally, to serve as computing power for the customer. Other applications for the virtual computer systems may be to support database applications, electronic commerce applications, business applications, and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a console data store that associates data objects with identifiers of the data objects which may be used by the customer 204 to retrieve or perform other operations in connection with the data objects stored by the on-demand data storage service 214. The on-demand data storage service 214 may also be accessible to the machine learning service 212. For instance, in some embodiments, the machine learning service utilizes the on-demand data storage service to store the console data of the customers, where the console data is usable for training the machine learning service 212 or monitoring by the machine learning service 212 the instances executed by the customer 204 on the virtual computer system service 208. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and a browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes, such as monitoring applications executing in the virtual computer system service, workflow systems, time-sensitive information updates, mobile applications, and many others. In various embodiments the notification service 216 may be used by the troubleshooting service 222 to provide troubleshooting information to the customer 204.

The computing resource service provider 202 may additionally maintain one or more other services 218 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services, and/or other services.

As illustrated in FIG. 2, the computing resource service provider 202, in various embodiments, includes an authentication system 220. The authentication system in an embodiment is a computer system (i.e., collection of computing resources) configured to perform operations involved in authentication of the customer. For instance, one of the services may provide information from the customer to the authentication service to receive information in return that indicates whether or not the user requests are authentic.

Figure 3:
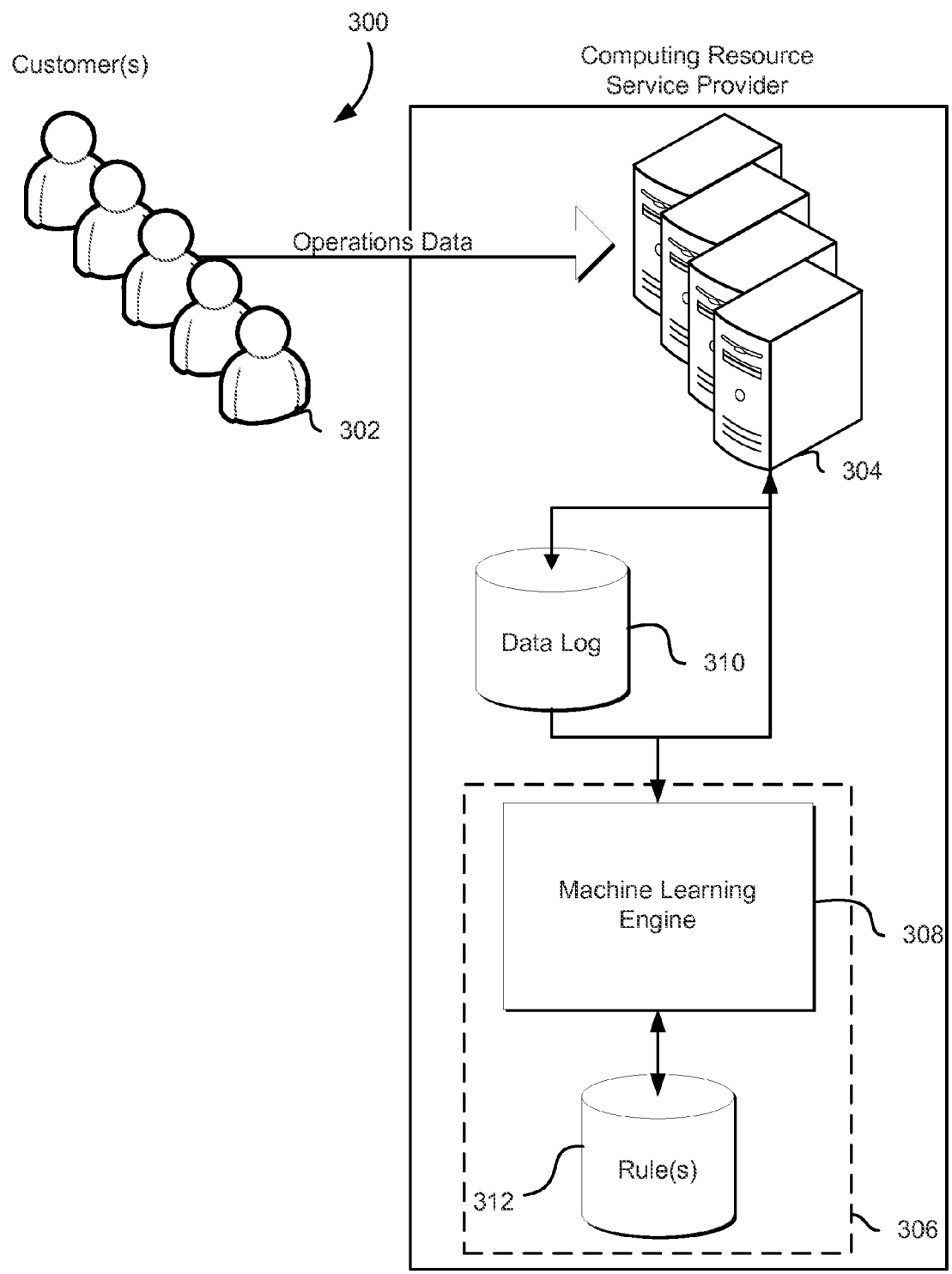
FIG. 3 shows an illustrative example of an environment in which various embodiments may be practiced.

FIG. 3 shows an illustrative example of an environment in which various embodiments may be practiced. FIG. 3 shows an environment 300 in which customers 302 remotely manage virtual machine instances executed on hardware operated by a computing resource service provider 304. The operating instances of the customers may generate operational data used by the machine learning service 306 to provide improved troubleshooting to customers. The machine learning service 306 operated by the computing resource service provider 304, in various embodiments contains a machine learning engine 308 for classifying error states in operational data, a data log for storing operational data generated by customer instances, and one or more rules 312 for classifying operational data.

As described above, in various embodiments, the machine learning engine 308 may use one or more machine learning algorithms to analyze console data stored in the data log 310. The machine learning service 306 may use computing resources of the service provider 304 to execute machine learning operations. For example, the machine learning service 306 may operate the data log 310, which may use on-demand data storage 214, as described in reference to FIG. 2, to store operational data for use by the machine learning engine 308. The machine learning engine 308 may maintain rules 312 for classifying operational data. For example, the rules 312 may provide that a particular error message or set of messages correspond to a particular error classification or a set of error classifications, which may be ranked. In various embodiments, these error classifications may be further broken down into sub-classifications (e.g. the memory error classifications may include sub-classifications, such as out of memory errors or memory management errors), which may include rules for each sub-classification.

The machine learning service 306 may, in various embodiments, provide monitoring of instances to detect errors and automatically correct them. For example, the machine learning engine 308 may be provided with a directed acyclic graph containing the probabilistic relationship between errors and console data, sometimes referred to as a Bayesian Network. Give particular console data, such as an error code or instance activity, the machine learning engine can compute the probabilities of the presence of various errors. The computing resource service providers 304 may store console data in the data log 310 and provide the machine learning engine with the directed acyclic graph stored as rules 312. The machine learning engine 308 may then calculate the probability of errors given the console data and the set of rules. In various embodiments, if an error is detected, information regarding the error maybe passed on to the troubleshooting system, as discussed in more detail below in relation to FIG. 4.

Any other suitable machine learning algorithms may be used by the machine learning engine 308. In various embodiments, the machine learning engine 308 may use a decision tree, such as a classification tree, or may use multiple decision trees, such as a random forest, to improve error classification. The machine learning engine may be seeded with training tuples in order to aid the machine learning engine 308 in creating the decision tree. The decision tree created by the machine learning engine 308 may contain internal nodes which represent tests relating to attributes or features of console data, each branch of the note corresponding to a result of the test and each terminal node corresponding to a classification. In various embodiments, the decision tree created can then be stored as rules 312 and used to analyze console data stored in the data log 310 as it is made available by the service provider 304.

The techniques described in relation to specific examples of machine learning algorithms as described in relation to FIG. 3 may be used with any other suitable machine learning algorithms. In various embodiments, one or more machine learning algorithms may be used and corresponding rules or data structures required for execution of the machine learning algorithm may be stored in rules 312. In various embodiments, when more than one machine learning algorithm is used, a selection algorithm may be used to determine a classification for the console data. For example, a selection may be made based on the machine learning algorithm that returns the highest probability for a particular classification. In still other embodiments, a selection maybe made based on what a majority of the machine learning algorithms determine to be the highest probable classification. Any other suitable selection algorithm may be used to determine a classification when more than one machine learning algorithm is used.

Figure 4:
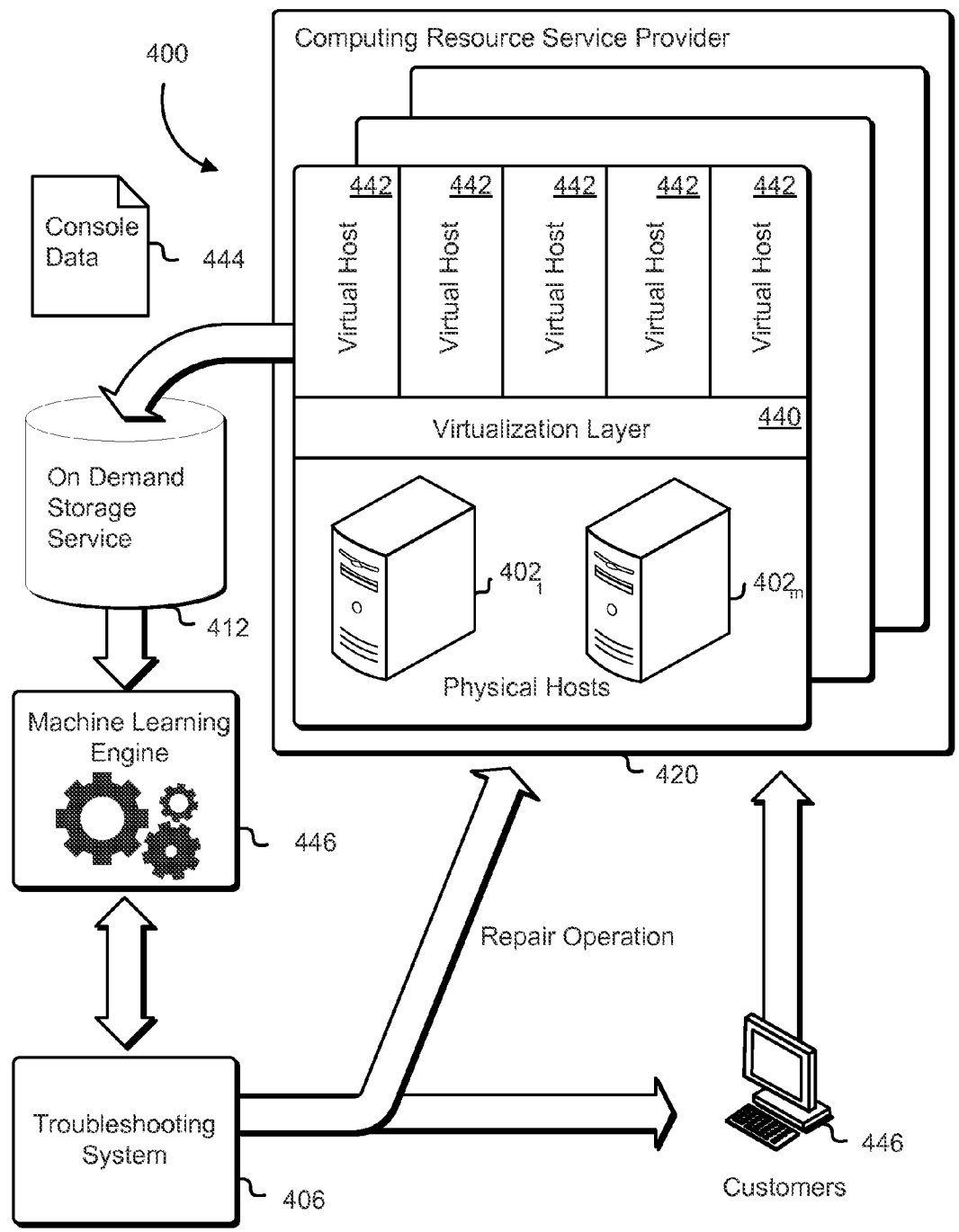
FIG. 4 shows a diagram illustrating a manner in which data may be used for machine learning in accordance with at least one embodiment.

In order to increase accuracy of various machine learning algorithms a training phase as noted above may be used. FIG. 4 accordingly shows an illustrated example of an environment 400 in which a training phase may be conducted. As illustrated in FIG. 4, computing resource service provider 420 operates a multitude of physical hosts $402_{1-m}$. The physical hosts $402_{1-m}$ may be any device or equipment configured to execute instructions for performing data computation, manipulation, or storage tasks, such as a computer or a server. A physical host 402 may be equipped with any needed processing capability, including one or more processors, such as a central processing unit (CPU), a graphics processing unit (GPU), or a digital signal processor (DSP); memory, including static and dynamic memory; buses; and input and output ports that are compliant with any handshaking, communications, or data transfer protocol.

A virtualization layer 440 in the computing resources service provider 420 enables the physical hosts 402 to be used to provide computational resources upon which one or more virtual hosts 442 may operate. The virtualization layer 440 may be any device, software, or firmware used for providing a virtual computing platform for the virtual hosts 442. The virtual computing platform may include various virtual computer components, such as one or more virtual CPUs, virtual memories, virtual disks, and the like. The virtual hosts 442 may be provided to the customers of the computing service resource provider 420 and the customers may run an operating system or an application on the virtual host 442. Further, the computing service resource provider 420 may use one or more of its own virtual hosts 442 for executing its applications. Examples of the virtualization layer 440 include a bare metal hypervisor or a hosted hypervisor.

The virtual hosts 442 run by the customers may further generate console data 444 based on the operation of the virtual host 442. Console data may be saved directly by the virtual host 442 in the on-demand storage service 412 or the virtualization layer 440 may include a hypervisor which may save the console data 444 to the on-demand storage service 412. In various embodiments, console data includes operation of the virtual host by the customer and the operational status of the virtual host. Data regarding operation of the virtual host by the customer includes any information regarding the actions performed by the customer (e.g. commands entered by the customer into a terminal or mouse click performed by the customer in a GUI). Data regarding the operational status of the virtual host includes any information not related to an action performed by the customer (e.g. memory usage of the virtual host, file systems, information regarding virtual CPUs, or any other information regarding the virtual host). In various embodiments, console data may be periodically written to on-demand storage as described above in reference to FIG. 2. This data may be in any format suitable for operation with the machine learning engine. The console data 444 may, in various embodiments, be converted into a format suitable for use with the machine learning engine. In various embodiments, console data 444 maybe store persistently using the on-demand storage service 412 in such a way that customers may be able to access console data.

In various embodiments, during the machine learning engine 446 training phase, on-demand storage service 412 may be used to store classification information and rules to seed the machine learning engine. Console data 444 may be collected from virtual hosts 442 and stored in the on-demand storage service 412. In various embodiments, collection and storage of console data 444 may be triggered once a virtual host 442 enters an unhealthy state, a virtual host's state may be determined periodically through the use of a status or health check function. For example, the service provider may operate a status check service which determines the health or status of an instance every five minutes, the status check service may make appropriate function or API calls to the instance or the hypervisor managing the instance to determine the instance's health. The status check service may also reside in the hypervisor or dom0. An instance may be said to enter an unhealthy state when one or more errors occur during the operation of the instance. In various embodiments, once there is sufficient console data to enable training, the console data may be passed to the machine learning engine 446. In various embodiments, the machine learning engine may use the seeded rules to classify console data received and update the seeded rules based on the classification of console data. The training phase may further include review of the classification operations by a human or another machine learning algorithm. For example, the computing resource service provider may, after the machine learning engine uses the seeded information to classify the training set of console data, review the results and reclassify the console data that may be determined to have been misclassified by the machine learning engine. The machine learning 446 engine can then update the rules based on this reclassification.

In various embodiments, the machine learning engine may be configured to determine error classifications based on console data received, the console data relating to a particular error that occurred on the virtual host 442, as well as operations performed by the customer to correct the error, and whether the operations were successful in correcting the error. As described above, console data may be parsed using grammar rules that organize the data in such a way that the particular errors that occur are included with information from the console regarding any corrective measures or other features of the console data that relate to the error. In various embodiments, the machine learning engine is passed console data to be analyzed without parsing the information. The machine learning engine 446 may be configured to detect the existence of multiple errors in console data and splitting the console data in to multiple events, each representing a particular error in the console data. In various embodiments, the machine learning engine 446 may also be configured to extract information from the console data relating to successful actions taken by the customer operating the instance to remediate errors that may occur.

For example, in various embodiments, the machine learning engine 446 maybe seeded with known error codes and corresponding solutions. The machine learning engine 446 may then be passed a large amount of console data for training purposes, which it may then analyze and classify into particular error classifications, such as described above. In various embodiments, the machine learning engine may then compare seeded solutions with solutions observed in console data and determine which solutions were most successful. Once the machine learning engine 446 determines that a particular solution is more successful, it may then update the troubleshooting system 406 with the more successful solution. In various embodiments, the troubleshooting system 406 may be implemented as or comprise a rules engine in order to provider solutions to customers. The machine learning engine may determine the success of a solution to a particular error classification in any suitable way. For example, in various embodiments, the machine learning engine may determine a solution's success by the number of times it has been employed by customers to remediate a particular error classification. The machine learning engine may also determine success by the number of steps or amount of time required to achieve the desired result or simply if the desired result has been achieved. Furthermore, in various embodiments, different metrics maybe combined to determine the success of a particular solution.

For example, in various embodiments, the machine learning algorithm may determine that a first solution is the most successful because it requires the least amount of steps to correct the error, but may later determine a second solution to be more successful because an overwhelming majority of customers employ the second solution as opposed to the first. The machine learning engine may then update the troubleshooting system 406 to reflect this determination. In various embodiments the troubleshooting system 406 may passively provide solution to customers. For example, the troubleshooting system may be a webpage operated by the service provider to provide support for customers of the service providers. The webpage may be automatically updated with information determined by the machine learning engine either during the training phase or in the monitoring phase. The troubleshooting system 406 itself or with the aid of the machine learning engine 446 may, in various embodiments, actively scan console data for error codes and provide customers with solution information automatically. The solution information provided by the troubleshooting system 406 may be a link to a webpage, a prompt, a flowchart, or any other form suitable for conveying information to a customer.

In various embodiments, the machine learning engine by itself or in conjunction with the troubleshooting system may monitor virtual hosts 442 for errors that may occur during operation of the virtual hosts by the customer. The monitoring phase may occur contemporaneously with the training phase or after the training phase has completed. In various embodiments, the training phase of the machine learning engine 446 may occur supervised or unsupervised. In various embodiments, during the monitoring phase the machine learning engine may continue to update classifications and rules for the classifications. A particular classification may be based on an event extracted from the console data where the event corresponds with a particular error that occurs. The event may have one or more features where the features correspond to rules for the event's classification. In various embodiments, an event may also be labeled by the machine learning engine for classification purposes. For example, a label or event may correspond to a particular type of error, such as memory errors as described above, and features of the label or event may include error codes or the operational state of the instance, such as the instance being out of memory. In various embodiments features may also include operations performed by the customer to correct errors in the instance.

The monitoring phase may operate in a similar manner as the training phase. In various embodiments, console data 444 generated by virtual hosts 442 may be stored in on-demand storage 412 operated by the service provider 420. Once the console data written to storage reaches a predetermined threshold, it is released or passed to the machine learning engine. This predetermined threshold may be during the monitoring phase may be lower than the threshold discussed in regards to the training phase4. During the training phase of the machine learning engine, more console data may be required for the machine learning engine to adequately learn the proper classifications and corresponding rules. However, during the monitoring phase less data maybe required for the machine learning engine to determine a classification and a lower threshold value may better facilitate monitoring the instances.

In various embodiments, the console data may be contemporaneously or nearly contemporaneously transmitted to the machine learning engine 446 while the console data is being written to storage. The machine learning engine may operate a buffer to temporarily store console data 444 in order to facilitate monitoring the instances. In various embodiments, the console data may be streamed to the machine learning engine 446 to facilitate monitoring. For example, the customer may launch an instance using a virtual host 442. The computing resource service provider 420 may then instantiate a machine learning engine 446 to monitor operation of the customer instance on the virtual host 442. The customer may be able to opt in to the machine learning engine service or the machine learning engine service may be automatically provided to all customers of the computing resource service provider 420. For example, the customer may opt in to the service and when an error occurs in an instance a solution is applied by the troubleshooting system 406 without a corresponding request by the customer to correct the error or other possible actions taken by the customer to correct the error. In various embodiments, the computing resource service provider 420 may operate one machine learning engine 446 to monitor all virtual hosts 442 or multiple machine learning engines 446 may monitor one or more virtual hosts 442.

In various embodiments, the machine learning engine 446 may monitor console data 444 generated by one or more virtual hosts 442. Once an error is detected by the machine learning engine, the information is transmitted to the troubleshooting system 406. The machine learning engine 446 may use one or more machine learning algorithms to classify errors found in the console data 444. In various embodiments, when more than one machine learning algorithm is used by the machine learning engine 446, different selection methods may be used to determine a classification if no consensus exists between the different machine learning algorithms. For example, a threshold value for the probability of a classification may be set and the classification for the event may be selected by the machine learning algorithm whose probability reaches or exceeds the predetermined threshold value.

Information transmitted to the troubleshooting system 406 may include a particular error classification determined by the machine learning engine 446 and a particular virtual host 442. In various embodiments, the troubleshooting system 406 may include known solutions for particular errors and may transmit the solutions to the customer operating the virtual host 442. In various embodiments the solutions transmitted to the customer may include a list of rules, a set of steps to follow or a decision tree. For example, machine learning engine 446 may detect a memory error in console data 444 from the virtual host 442, such as:

[115879.769795] Out of memory: kill process 20273 (htpd) score 1285879 or a child [115879.769795] Killed process 1917 (php-cgi) vsz:467184 kB, anon-rss: 101196 kB, file-rss:204 kB The machine learning engine may transmit information regarding the memory error found on the virtual host 442 to the troubleshooting system 406. The troubleshooting system 406 may determine relevant solution information, such as modifying the instance and rebooting the instance, the troubleshooting system may then transmit this information to the customer via the virtual host 442 or in any manner suitable for alerting the customer. In various embodiments the troubleshooting system 406 may automatically apply solutions to error classifications received from the machine learning engine 446. For example, the machine learning engine 446 may detect a file system error, such as failure to mount a virtual desk, from console data 444 generated by virtual host 442. The machine learning engine 446 may then transmit the error classification to the troubleshooting system 406 and the troubleshooting system may provide a solution, such as remounting the virtual disk for the customer executing the virtual host 442.

In various embodiments, the machine learning engine may classify new events or learn new solutions from console data 444. For example, new applications executing on virtual hosts 442 may encounter errors the machine learning engine 446 has not previously classified. In various embodiments the machine learning engine 446 may use one or more machine learning algorithms to classify an event with none of the machine learning algorithms returning a probable classification. If no classification exists, the machine learning engine may create a new classification and create rules for the classification based on features found in the console data 444. The machine learning engine 446 may then pass this information on to the troubleshooting system 406, the troubleshooting system itself or with the aid of the machine learning engine may then monitor customer operations data to determine if the customer will remediate the error. In various embodiments a similar process may be used to update the troubleshooting system when a new solution is learned by the machine learning engine 446.

As described above, the machine learning engine may learn a new solution from console data 444 or determine a particular solution is more desirable and forward this information onto the troubleshooting system 406 to enable the troubleshooting system to update information regarding the particular error. In various embodiments, the troubleshooting system 406 may maintain a list of all known and learned solutions, may list only the solution determined by the machine learning engine to be most desirable, may list solutions in descending order from most desirable solution to least desirable, may only list one solution, may be a solution set or any other suitable means for listing solution information. In various embodiments, the troubleshooting system 406 may be integral to the machine learning engine 446 and may maintain solutions as features of events.

Figure 5:
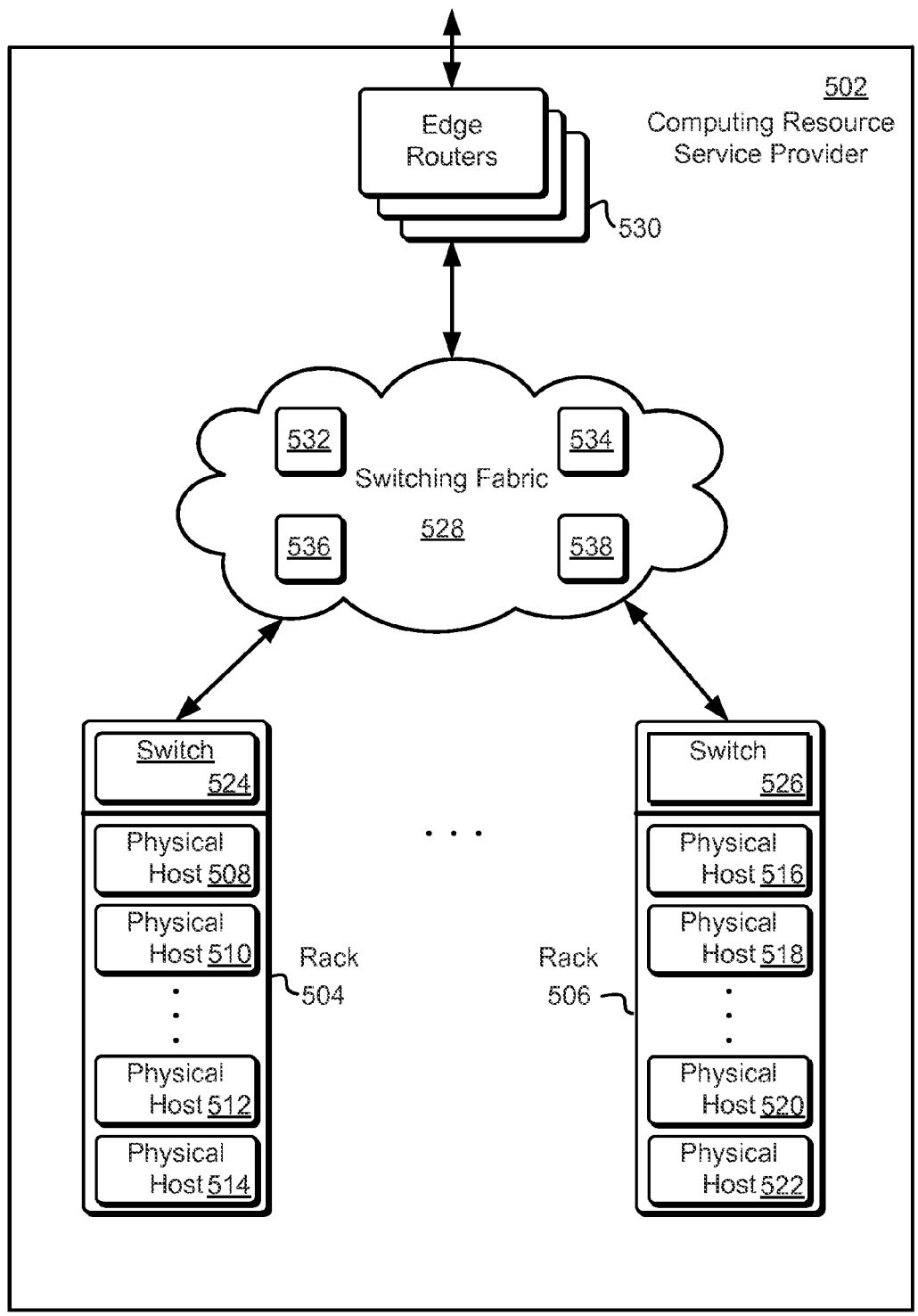
FIG. 5 shows a diagram illustrating aspects of a computer resource service provider in accordance with at least one embodiment.

FIG. 5 depicts aspects of data centers in accordance with at least one embodiment. A data center 502 may include multiple server racks 504-506. The data center 502 is an example of one or more data centers that may be used to implement a computing resource service provider, such as the computing resource service provider described with reference to numeral 202 in FIG. 2. The server rack 504 and the server rack 506 located in the data center 502 may include any suitable number of server racks although, for clarity, only two are shown in FIG. 5. Each server rack 504-506 may participate in maintaining services, such as electric power and data communications to multiple physical hosts 508-514 and 516-522. The server racks 504-506 may include any suitable number of physical hosts. The physical host may be used for supporting the operation of virtual hosts, such as those described in reference to FIG. 4. For example, the physical hosts 508-522 may include one or more virtual computing system service servers, one or more data store servers, and/or one or more machine learning services. In various embodiments the physical hosts 508-514 may operate as the physical host for the troubleshooting system. For example, the troubleshooting system as described above may include a web page operated by the service provider on a physical host with the website containing a list of errors and known solutions that may be updated by the machine learning engine.

In FIG. 5, each server rack 504-506 is depicted as including a rack switch 524-526. The rack switches 524 and 526 may be responsible for switching packets of digital data to and from their respective sets of physical hosts 508-514 and 516-522. In various embodiments disclosed herein, different service offered by the service providers may be located on different physical hosts and it may be the responsibility of the rack switches to ensure information is exchanged correctly between services. For examples, the machine learning service and troubleshooting service may be located on different physical hosts, which may require the rack switches to route information between the two. The rack switches 524-526 may be communicatively linked to a data center switching fabric 528 and then to a set of edge routers 560 that connects the data center 502 to one or more other computer networks including the Internet, which may be used for communication with the customer. The switching fabric may include any suitable set of networking components including multiple interconnected switches 562-568 (for clarity, only four are shown in FIG. 5) of one or more switch types arranged in one or more switching layers, as well as routers, gateways, bridges, hubs, repeaters, firewalls, computers, and suitable combinations thereof. In at least one embodiment, the rack switches 524-526 and the edge routers 560 are considered part of the switching fabric 528.

Figure 6:
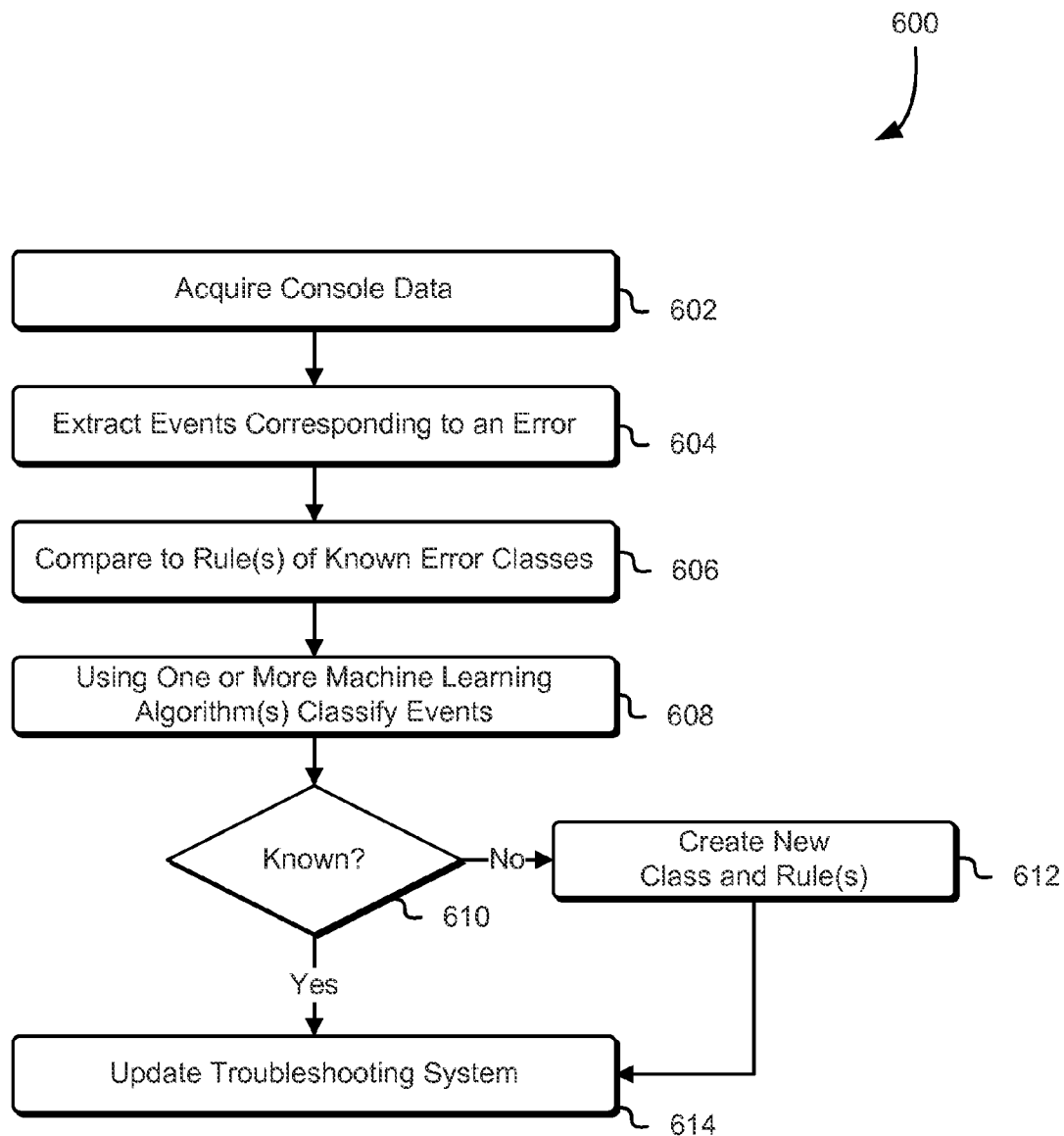
FIG. 6 shows an illustrative example of a process for machine learning in accordance with an embodiment.

FIG. 6 shows an illustrative example of process 600 which may be used to enhance troubleshooting. The process 600 may be performed by any suitable system, such as by the computer resource service provider as described in connection with FIG. 2 and/or an appropriate component thereof, such as by a machine learning service 212. Returning to FIG. 6, in an embodiment the process 600 includes acquiring console data 602 from a virtual machine instance operated by the customer, the console data acquired in any suitable manner. For example, referring to FIG. 4, the console data may be stored in on-demand storage service 412 and periodically pulled by the machine learning engine 446. As illustrated in FIG. 6, once console data has been acquired the process 600 may include extracting events 604. As described above, extracting events may include parsing console data and providing the parsed console data to the machine learning engine for analysis. In various embodiments the machine learning engine may use one or more machine learning algorithms to compare 606 to the extracted event 604. In various embodiments, the machine learning engine may extract events 604 and compare the extracted events to rules 606 without parsing the console data.

As illustrated in FIG. 6, once the events are compared to the rules 606 the events are classified 608. Referring to FIG. 4, the machine learning engine 446 may apply one or more machine learning algorithms to compare the extracted event to the rules provided by the one or more machine learning algorithms in order to classify the event. As described above, when more than one machine learning algorithm is used, a selection method may be used to determine a final classification for the event. Returning to FIG. 6, the machine learning engine may attempt to classify the event 608 and if the event is known 610 the machine learning engine may update the troubleshooting system 614 if needed. If, however, the event classification is unknown, the machine learning engine may create a new class and one or more new rules for the class 612. In reference to FIG. 4, for example, if the machine learning engine 446 determines that no classification for the extracted event exists it may then create a new class by generating a class label from any error code found in the console data and may also generate rules from features found in the console data, such as status information of the instance or operations performed by the customer.

In various embodiments, updating the troubleshooting system 614 may include updating or creating new rules for the class to be used by the machine learning engine to aid in the classification of events and providing solutions to the customer. For example, the machine learning engine may learn new features of a classification either during a training phase or monitoring phase. Specifically in reference to FIG. 4, the machine learning engine 446 may be seeded with information regarding error classification and features that may be used as rules for determining error classifications and passed a training set of console data. In analyzing the training set using one or more machine learning algorithms, the machine learning engine may learn that a particular feature always corresponds to a particular error, such as a memory dump before a kernel error. The machine learning engine 446 may then update the rules for classification with the information learned during the training phase.

Numerous variations of the process 600 may be performed. The process 600 illustrated in FIG. 6 may be used in the training phase or monitoring phase of the machine learning service operated by the computer resource service provider. The process may also be used for re-training purposes or operated by a party other than the computing resource service provider. For example, a third party may offer the machine learning service to customers of various computer resource service providers or various end users. In various embodiments, the machine learning engine may be aided by a boosting algorithm, in which a set of weak machine learning algorithms are used to create a single strong machine learning algorithm.

Figure 7:
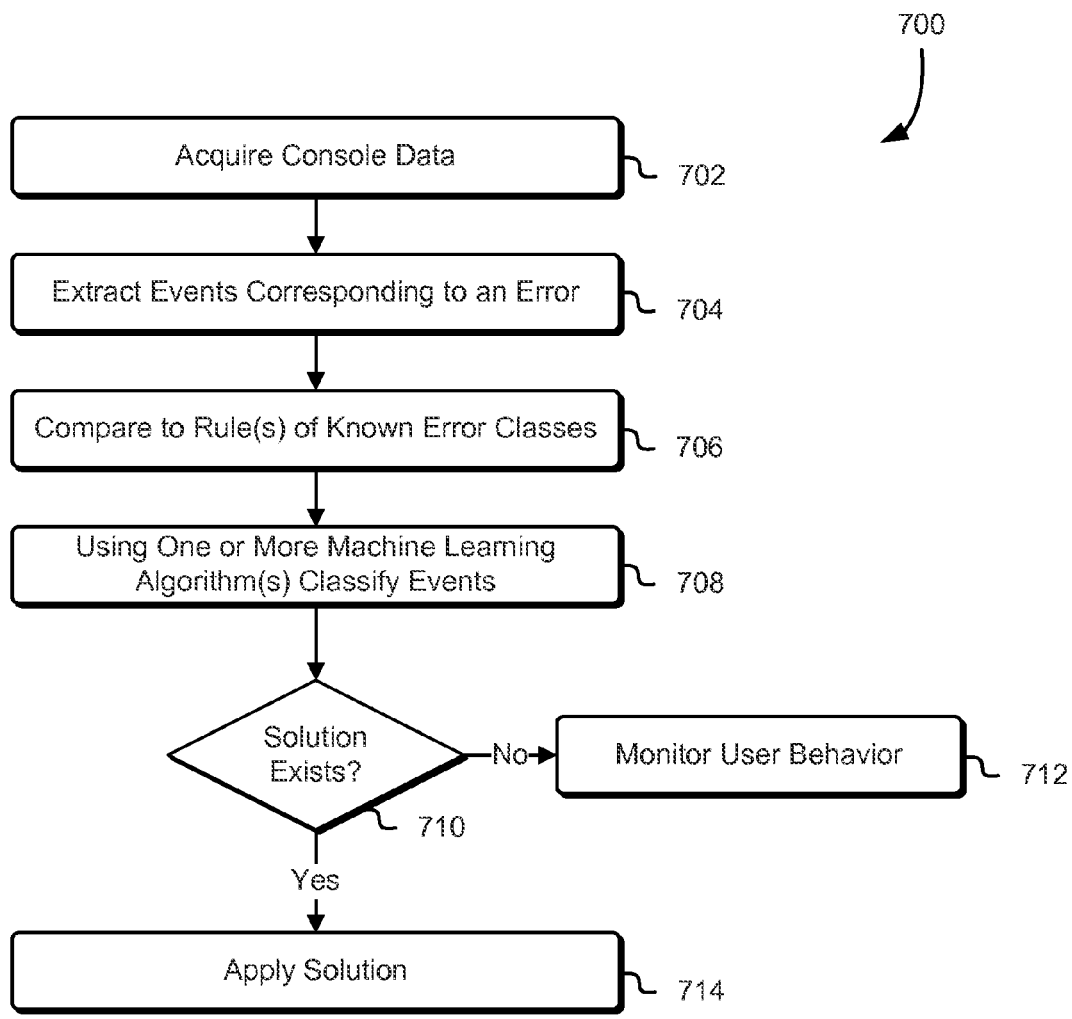
FIG. 7 shows an illustrative example of a process for troubleshooting in accordance with an embodiment.

FIG. 7 shows an illustrative example of process 700 that may be used to enhance troubleshooting. The process 700 may be performed by any suitable system, such as by the computer resource service provider as described in connection with FIG. 2, and/or an appropriate component thereof, such as by a machine learning service 212. Returning to FIG. 7, in an embodiment, the process 700 includes acquiring console data 702 and extracting one or more events 704 from the console data. In various embodiments, the console data may be parsed or similar operation preformed to remove all events from the data before proceeding to the next step in process 700. In various embodiments as described above, when console data is being streamed to the machine learning engine, extracting events 704 may store data in a buffer until an event is detected and then the machine learning engine may use one or more machine learning algorithms to compare the event to classification rules 706 in order to classify the event 708.

In various embodiments, extracting events 704 comparing to rules 706 and classifying events 708 may occur contemporaneously or nearly contemporaneously. For example, with reference to FIG. 4, the machine learning engine 446 may receive a large amount of console data as a training set. The machine learning engine may then analyze the data by extracting an event, comparing the event to rules, and classifying the event before extracting another event from the console data. As described above in reference to FIG. 6, if no classification exists for the event the machine learning engine may create a new classification and rule set for the event.

Returning to process 700, once an event has been classified 708, the process continues to determine if a known solution exists 710 for the classification. This determination may be made 712 by the troubleshooting system, machine learning engine, or any other suitable system or device. In various embodiments, if it is determined that a known solution exists the solution may be applied 714. The solution may be applied directly to the customer instance, presented to the customer in any suitable manner for execution by the customer, or may be recorded for execution at a later time. For example, referring to FIG. 4, the troubleshooting system 406 may apply the solution directly to the virtual host 442. If it is determined at step 710 of process 700 that a solution does not exist, then the customer instance may be monitored 712 in order to determine a solution. In various embodiments, monitoring 712 the customer instance may include acquiring additional console data and determining if the operations performed by the customer remediated the error and updating the troubleshooting system if a solution is found. In various embodiments, monitoring 712 may initiate or loop back into other processes. For example, referring to FIG. 6, monitoring user behavior may initiate process 600 in order to update the troubleshooting system.

Figure 8:
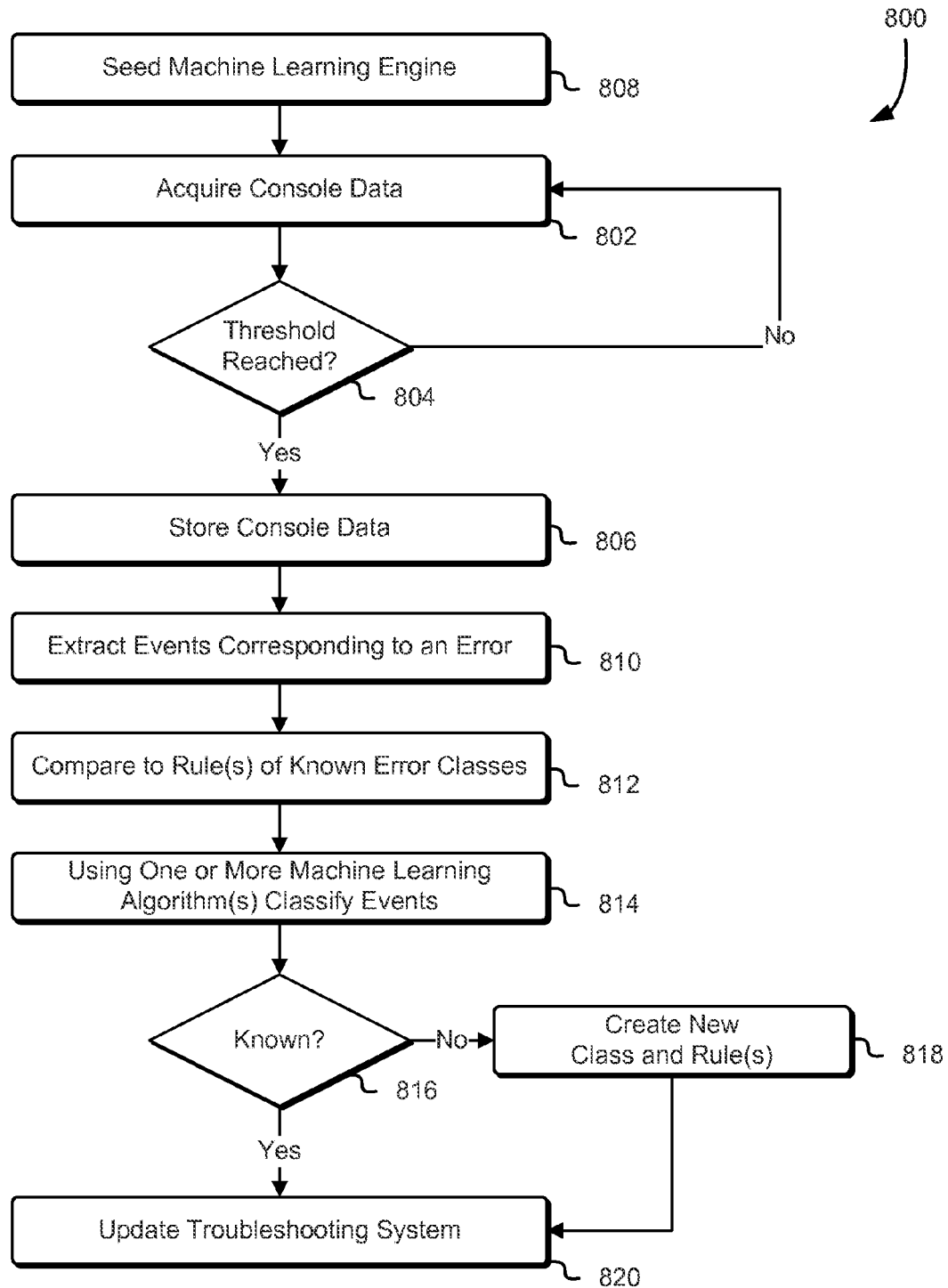
FIG. 8 shows an illustrative example of a process for machine learning in accordance with an embodiment.

FIG. 8 shows an illustrative example of process 800 that may be used to enhance troubleshooting and training of the machine learning engine. The process 800 may be performed by any suitable system, such as by the computer resource service provider as described in connection with FIG. 2, and/or an appropriate component thereof, such as by a machine learning service 212. Returning to FIG. 8, in an embodiment, the process 800 includes seeding 808 the machine learning engine. In various embodiments, for example, seeding the machine learning engine may include providing the machine learning engine with a set of training examples. Using one or more machine learning algorithms the machine learning engine may generate a function that maps inputs to desired outputs by looking at examples of inputs and outputs in the training set. This process is often referred to as supervised learning.

Once the machine learning engine has been seeded with the training set, the process 800 continues by acquiring console data 802. A threshold 804 may be set to ensure that there is adequate console data for training purposes. In various embodiments, the console data may include console data from one or more virtual machine instances operated by a customer of the computing resource service provider. As described above, storing console data 806 may include storing console data of virtual hosts in on-demand storage provided by the computing resource service provider. Once the threshold 804 has been reached and an adequate amount of console data has been stored 806, process 800 may continue by extracting events 810 from the console data. Extracting events 810, comparing to rules 812, and classifying events 814, may operate as described above with reference to FIG. 6 and FIG. 7.

In various embodiments, the machine learning engine may extract events 810 from the console data. Extracting the events may include parsing console data using grammar rules. These grammar rules may be designed such that errors, operational status of the console, and operations to correct errors are retrieved from the console data. Once the desired information is extracted from the console data, one or more machine learning algorithms may be used to compare 812 the extracted information to a set of rules for classifying events 814 by the one or more machine learning algorithms. In various embodiments, if the classified event corresponds to a known classification of errors, the console data may be analyzed to determine if the troubleshooting engine is to be updated 820. In various embodiments, process 800 may update the machine learning engine in step 820 along with or as an alternative to updating the troubleshooting system. For example, referring to FIG. 4, the machine learning engine 446 may analyze console data 444 and learn that a particular status of a virtual host may correspond to a particular error classification. The machine learning engine 446 may then create a new rule or set of rules that captures this information for use with the one or more machine learning algorithms.

Returning to FIG. 8, if the classified events is unknown 816, a new class and rules 818 may be created for use with the machine learning engine. In various embodiments, subclasses may be created 818 if determined by the machine learning engine. Once a new class and/or rules are created, this information is updated with the troubleshooting system 820. For example, if the machine learning engine creates a new error classification this information is updated with the troubleshooting system to enable the troubleshooting system to provide a solution or set of solutions for the new error classification. As described above with reference to FIG. 7, console data may be monitored in order to determine if a solution exists for the new error classification.

Figure 9:
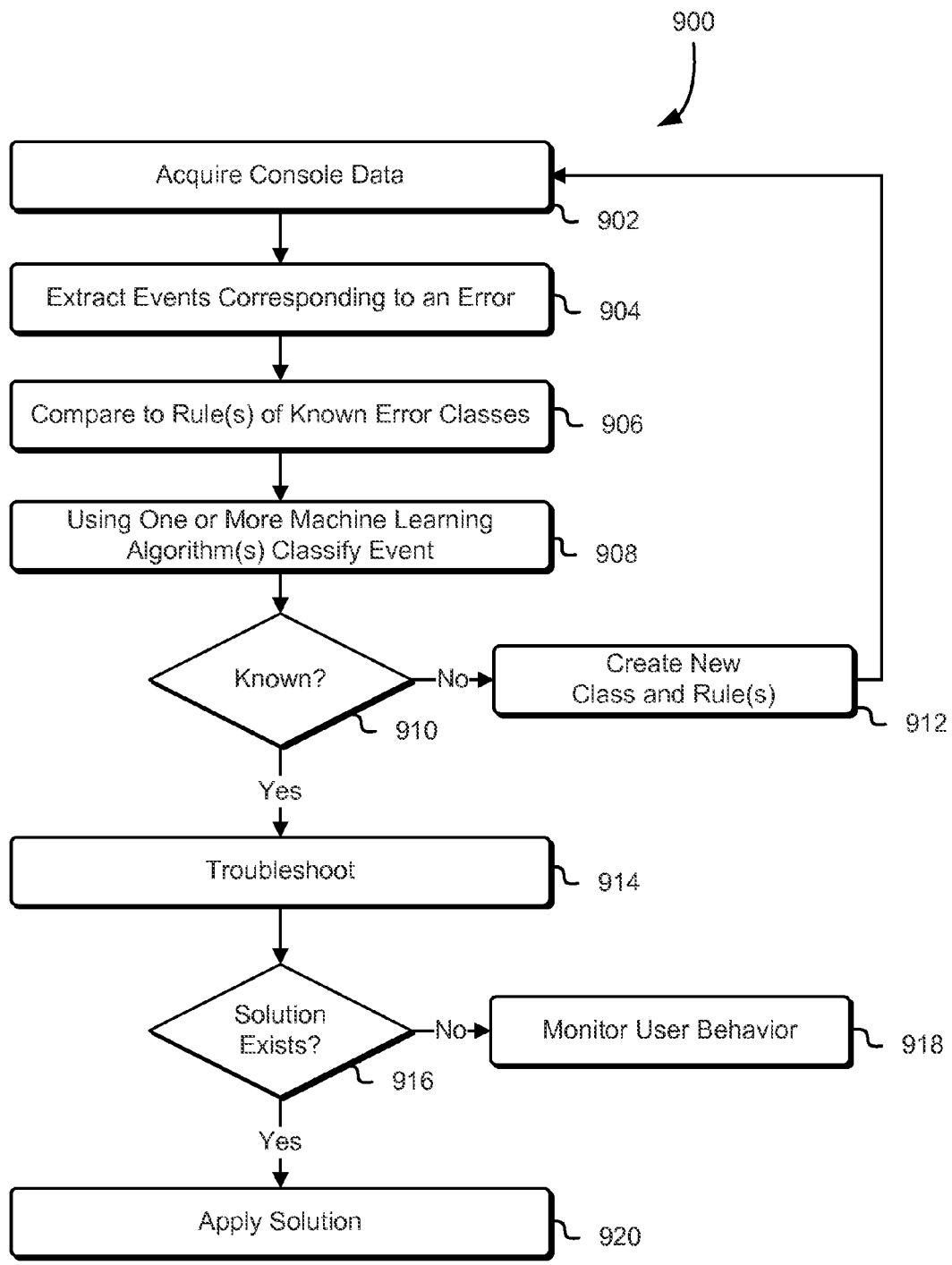
FIG. 9 shows an illustrative example of a process for machine learning and troubleshooting in accordance with an embodiment.

FIG. 9 shows an illustrative example of process 900 which may be used to enhance troubleshooting. The process 900 may be used during monitoring of customer instances to enable operation of the machine learning engine and the troubleshooting system. This may include enabling the machine learning engine to learn new error classifications and enabling the troubleshooting system to learn new solutions. The process 900 may be performed by any suitable system, such as by the computer resource service provider as described in connection with FIG. 2, and/or an appropriate component thereof, such as by a machine learning service 212. Returning to FIG. 9, in an embodiment, the process 900 includes acquiring console data 902. In various embodiments, acquiring console data 902 may be triggered by an event such as a change in the health or status of the instance. As described above, for example, the service provider may periodically determine the health of customer instances executing on service provider hardware. If the instance become unhealthy the machine learning service may be triggerd and acquire console data in order to determine if an error has occurred. Console data may be acquired from customer operated virtual instances as described above. Extracting events 904, comparing to rules 906, and classifying events 908 may operate as described above with reference to FIG. 6 and FIG. 7.

In various embodiments, extracted events 904 may correspond to errors that occur on the customer instance. The extracted events may include one or more features of the console data. The extracted events are then compared to rules 906 using one or more machine learning algorithms to analyze the events and the event's corresponding features. The one or more machine learning algorithms return a probability of the event being a member of a particular class 908. If no probability is returned by the one or more machine learning algorithms or the probability of the event being in any particular class is too low, the event is determined to be unknown 910. If the event is unknown, a new error classification and rule set may be created 912 to enable the machine learning engine to classify the event in the future. In various embodiments, process 900 may continue to acquire console data to further define any newly created error classification or rule set.

If the event is determined to be known 910, than the process may attempt to troubleshoot 914 the classified error. In various embodiments, this may include transmitting information regarding the known error classification to the troubleshooting system. For example, with reference to FIG. 4, the troubleshooting system 406 may receive from the machine learning engine 446 an indication that a particular error has occurred on virtual host 442. The troubleshooting system 406 may then determine if a solution to the known error classification exists. Returning to FIG. 9, if a solution exists 916 a solution may be applied 920. This solution may be applied, as described above, by the troubleshooting system directly to a virtual machine instance. In various embodiments, the troubleshooting system may apply a solution 920 by sending a uniform resource locator (URL) to the virtual machine instance operated by the customer. The customer may then, using the URL, load a webpage containing information about the error classification and known solutions. Along with any solution applied, the customer may also be presented with a prompt asking if the solution presented solved the error. This information may be used to update the troubleshooting system or machine learning engine.

In various embodiments, if no solution exists 916, a solution may be discovered by monitoring the behavior 918 of the customer operating the virtual machine instance. For example, the troubleshooting system may notify the customer that an error has been discovered, console data may then be acquired from the instance, and information regarding operations performed by the customer to correct the error may be acquired. In various embodiments, if no solution exists a default solution may be applied, such as notifying the customer and rebooting the instance. Monitoring user behavior 918 may operate for a predetermined amount of time or may continuously operate in order to improve the troubleshooting system.

Numerous variations of the process 900 may be performed. Process 900 may be used for training the machine learning engine as well as monitoring virtual machine instances running on hardware provided by the computing resource service provider. Process 900 may be modified to automatically update the troubleshooting system instead of applying a solution. In various embodiments, classifying events using one or more machine learning algorithms may include classifying the event based on a consensus between the machine learning algorithms. For example, the event may be classified 908 based on the a consensus of highest probable classification returned from each machine learning algorithm (e.g. six out of ten machine learning algorithms used determined that the most likely error classification is a memory error). If no consensus exists between the machine learning algorithms used, the highest returned probability may determine the classification or other suitable method.

Figure 10:
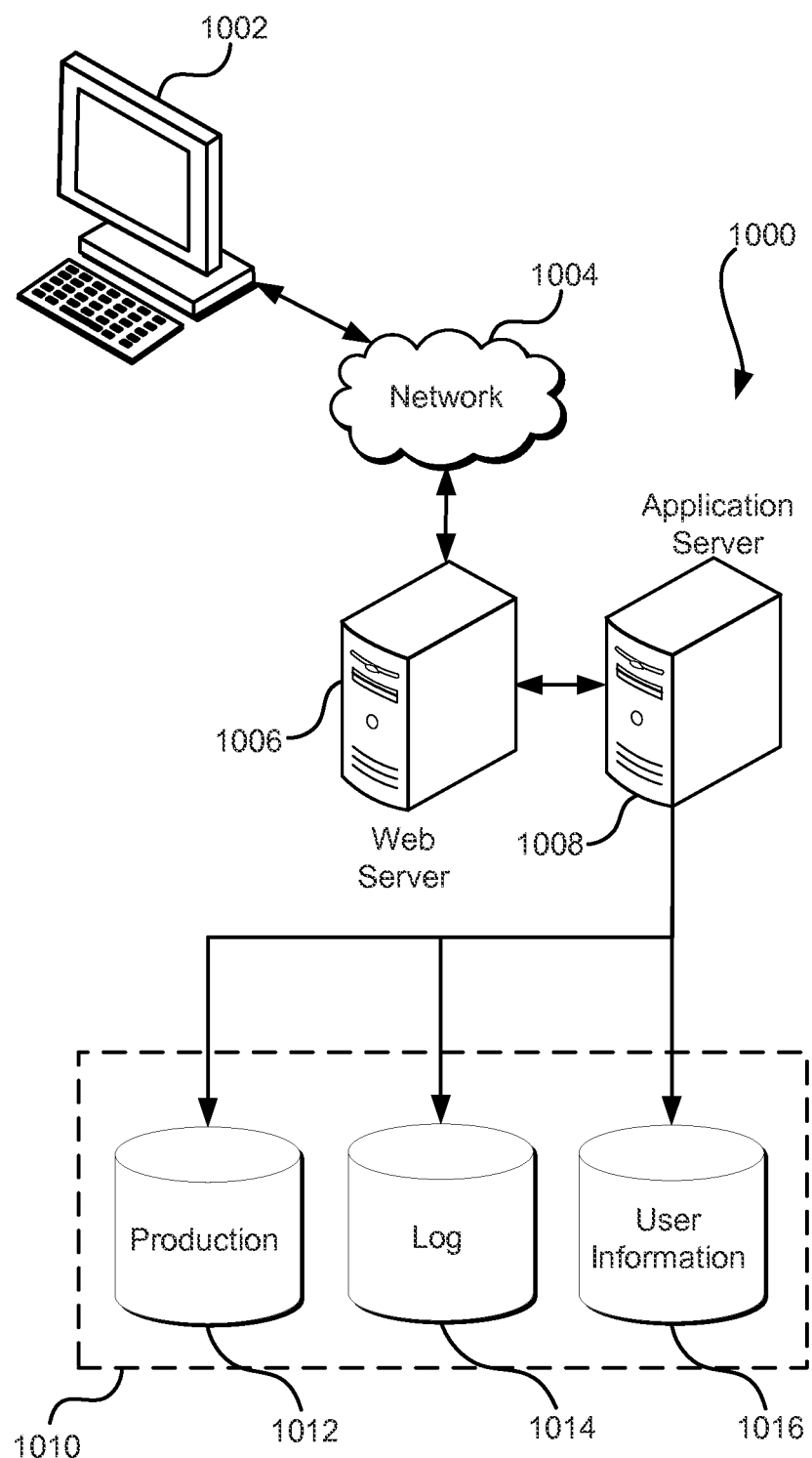
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used as appropriate to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed here in detail. Communication over the network can be enabled by wired or wireless connections and combinations thereof. In this example, the network includes the Internet and the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio, and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases, or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"), familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with or configured to receive a computer-readable storage medium, representing remote, local, fixed and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code or portions of code can include any appropriate media known or used in the art, including storage media and communication media such as, but not limited to, volatile and non-volatile, removable and non-removable media; implemented in any method or technology for storage and/or transmission of information such as computer readable instructions, data structures, program modules, or other data; including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    under the control of one or more computer systems configured with executable instructions,
        for each computer system instance of a plurality of computer system instances:
            detecting, based at least in part on console data output from the computer system instance, an error state for the computer system instance;
            for each user action of one or more user actions taken in connection with the computer system instance, recording the user action and a result of the user action in connection with the error state;
            using the recorded user action, result of the user action, and a machine learning algorithm to update a rules engine; and
        for a particular computer system instance:
            detecting, based at least in part on console data output from the particular computer system instance, a particular error state of the particular computing system instance;
            using the detected particular error state and the rules engine to determine one or more solutions for correcting the particular error state; and
            providing the determined one or more solutions.

2. The computer-implemented method of claim 1, wherein:
    the console data includes metadata information associated with the computer system instance, and
    the metadata is used at least in part to determine the type of computer system instance and the one or more solutions for correction the particular error state.

3. The computer-implemented method of claim 1, wherein the user action taken in connection with the computer system instance includes solutions attempted by the user to correct an error state.

4. The computer-implemented method of claim 1, wherein:
    the machine learning algorithm is seeded with training information before it is used to update the rules engine, and
    the training information is based at least in part on computer system instance configurations, error states encountered during the operation of computer system instances, and determined solutions to encountered error states.

5. The computer-implemented method of claim 1, wherein:
    updating the rules engine includes using multiple machine learning algorithms;
    determining to update the rules engine based on a consensus of the multiple machine learning algorithms; and
    if no consensus is found updating the rules engine based at least in part on the highest probability returned from the multiple machine learning algorithms.

6. The computer-implemented method of claim 1, wherein applying the solution to the computer system instance includes providing the user through the computer system instance a decision tree for correcting the error state.

7. A computer-implemented method for estimating the relevance of a result to a class of data, comprising:
    under the control of one or more computer systems configured with executable instructions,
        for each computer system instance of a plurality of computer system instances in an error state:
            recording console data output from the computer system instance, the console data containing a result of a user action in connection with the error state;
            using the recorded console data containing, the user action, the result of the user action, and a machine learning algorithm to update a set of troubleshooting rules; and
        for a particular computer system instance:
            detecting a particular error state of the particular computing system instance;
            using the detected particular error state and the troubleshooting rules to determine one or more solutions for correcting the particular error state; and
            providing the determined one or more solutions.

8. The computer-implemented method of claim 7, wherein:
    updating the troubleshooting rules includes using multiple machine learning algorithms; and
    determining to update the troubleshooting rules based on a consensus of the multiple machine learning algorithms;
    if no consensus is found updating the troubleshooting rules based at least in part on the highest probability returned from the multiple machine learning algorithms.

9. The computer-implemented method of claim 7, wherein the recording console data output from the computer system instance is triggered once the computer system instance becomes unhealthy.

10. The computer-implemented method of claim 7, wherein providing the solution includes providing the user a decision tree.

11. The computer-implemented method of claim 7, wherein:
    the machine learning algorithm is seeded with training information before it is used to update the rules engine, and
    the training information is based at least in part on computer system instance configurations, error states encountered during the operation of computer system instances, and determined solutions to encountered error states.

12. The computer-implemented method of claim 7, wherein:
- the user action and the result of the user action are contained in console data; and
- include with the console data, is metadata information associated with the computer system instance, and
- the metadata information is used at least in part to determine the type of computer system instance and the one or more solutions for correcting the particular error state.

13. A system, comprising:
- a data processing subsystem comprising a collection of computing resources collectively configured to:
  - collect data regarding the operation of a plurality computer system instances in an error state, the data being collected from output of the plurality of computer system instances;
  - using a set of rules, provide a set of solutions to a user of a particular computer system instance;
  - for each user action of one or more user actions taken in connection with the provided solution set, monitor a user action and a result of the user action; and
  - using the user action, result of the user action, and a machine learning algorithm to update the set of rules.

14. The system of claim 13, wherein:
- the data regarding the operation of a plurality of computer system instances includes metadata information associated with the computer system instance, and
- the metadata is used at least in part to determine the type of computer system instance and the set of solutions.

15. The system of claim 13, wherein providing the set of solutions to a user of a particular computer system instance includes applying a solution from the set of solutions without a synchronous customer request to apply the solution having been received to the particular computer system instance.

16. The system of claim 15, wherein the solution applied from the set of solutions is selected based at least in part on which of the solutions in the set of solutions is most often applied by users of computer systems instances to correct the error state.

17. The system of claim 13, wherein:
- the machine learning algorithm is seeded with training information before it is used to update the rules engine, and
- the training information is based at least in part on computer system instance configurations, error states encountered during the operation of computer system instances, and determined solutions to encountered error states.

18. The system of claim 13, wherein:
- updating the set of rules includes determining the user actions taken in connection with the provided solution set that result in correcting the error state, and
- updating the rules base at least in part on the determined user actions taken that resulted in correcting the error state.

19. A non-transitory computer-readable storage medium having stored thereon instructions that, when executed by one or more processors of a system, cause the system to:
- monitor output from a plurality of computing instances executing on resources provided by a service provide for error state and operations data;
- analyze the output from the plurality of computing instances, using one or more machine learning algorithms, to update a rule set;
- use the updated rule set to identify one or more solutions to the error state experienced by a particular computing system instance; and
- provide information specifying the identified one or more solutions.

20. The computer-readable storage medium of claim 19, wherein providing the information specifying the identified one or more solutions includes applying a solution from the one or more solutions without a synchronous customer request to apply the solutions having been provided.

21. The computer-readable storage medium of claim 19, wherein:
- updating the rule set includes determining the operations data that result in correcting the error state, and
- updating the rules base at least in part on the determine operations data that resulted in correcting the error state.

22. The computer-readable storage medium of claim 19, wherein:
- the monitored data includes metadata information associated with the computer system instance, and
- the metadata is used at least in part to determine the type of computer system instance and identifying the one or more solutions.

23. The computer-readable storage medium of claim 19, wherein analyzing the output from the plurality of computing instances includes determining when an attempted solution fails to correct the error state.

24. The computer-readable storage medium of claim 22, wherein:
- the machine learning algorithm is seeded with training information before it is used to update the rules engine, and
- the training information is based at least in part on computer system instance configurations, error states encountered during the operation of computer system instances, and determined solutions to encountered error states.

* * * * *